United States Patent [19]
Yanagimachi et al.

[11] 3,953,881
[45] Apr. 27, 1976

[54] COLOR PICTURE INFORMATION RECORDING AND REPRODUCING SYSTEM

[75] Inventors: Akio Yanagimachi, Kawasaki; Osamu Yamada, Kodaira, both of Japan

[73] Assignees: Nippon Hose Kyokai; Hitachi, Ltd., both of Tokyo, Japan

[22] Filed: Mar. 25, 1975

[21] Appl. No.: 561,708

Related U.S. Application Data

[63] Continuation-in-part of Ser. No. 419,254, Nov. 27, 1973, abandoned.

[30] Foreign Application Priority Data

Dec. 1, 1972   Japan.............................. 47-119830

[52] U.S. Cl. ...................................................... 358/4
[51] Int. Cl.² ........................ H04N 5/76; H04N 9/00
[58] Field of Search ........................................... 358/4

[56] References Cited
UNITED STATES PATENTS

| | | | |
|---|---|---|---|
| 3,372,228 | 3/1968 | Law | 358/4 |
| 3,626,087 | 12/1971 | Tomioka | 358/4 |
| 3,681,518 | 8/1972 | Hidaka et al. | 358/4 X |

*Primary Examiner*—Robert L. Griffin
*Assistant Examiner*—Mitchell Saffian
*Attorney, Agent, or Firm*—Stevens, Davis, Miller & Mosher

[57] ABSTRACT

A color picture information recording and reproducing system comprises a recording device for selectively recording color picture information and a pilot signal generator. In order to eliminate hue distortion of the reproduced color picture in case of selecting, recording, repeatedly reproducing and displaying a color picture signal of a single frame or a single field in a television broadcasting program or a still picture broadcasting program edited from different information at every frame or field, an input chrominance subcarrier and pilot signal of the output of a frequency locked signal generator are recorded on a record carrier together with an input color signal. The phase of the reproduced chrominance subcarrier is made continuous between adjacent frames or field by interleaving the pilot signal and a relation of frequency interleaving is maintained so as to eliminate phase jitter. The pilot signal generator is always frequency locked by means of another synchronizing signal having a frequency which is in a certain relation with that of the chrominance subcarrier.

8 Claims, 18 Drawing Figures

FIG_1
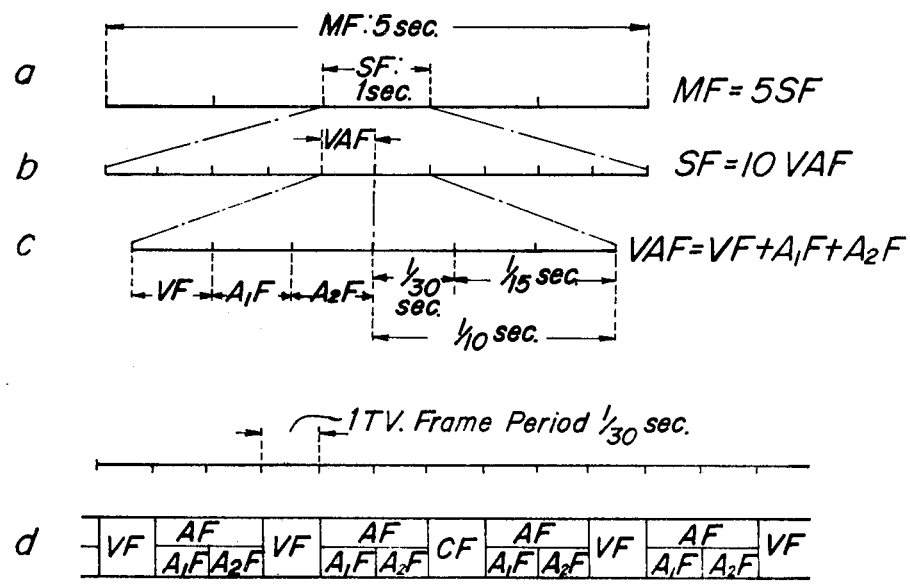
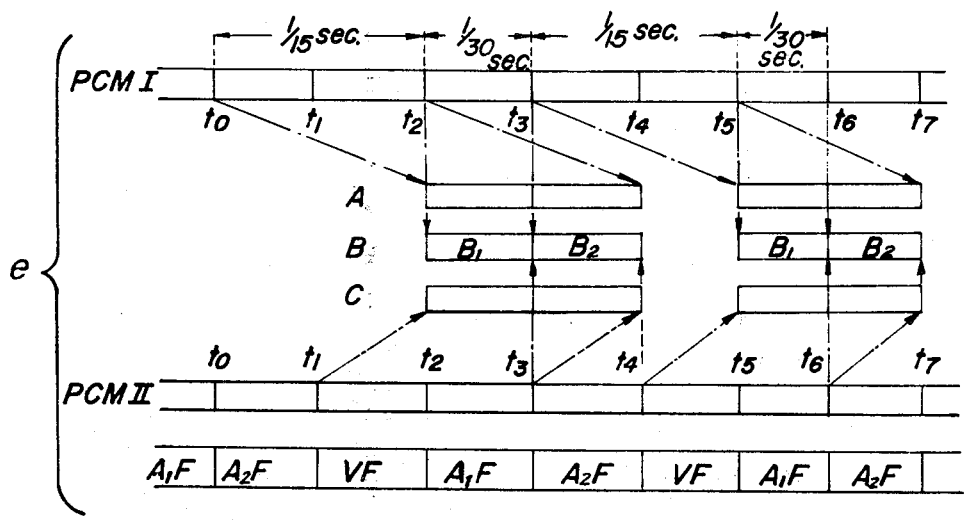

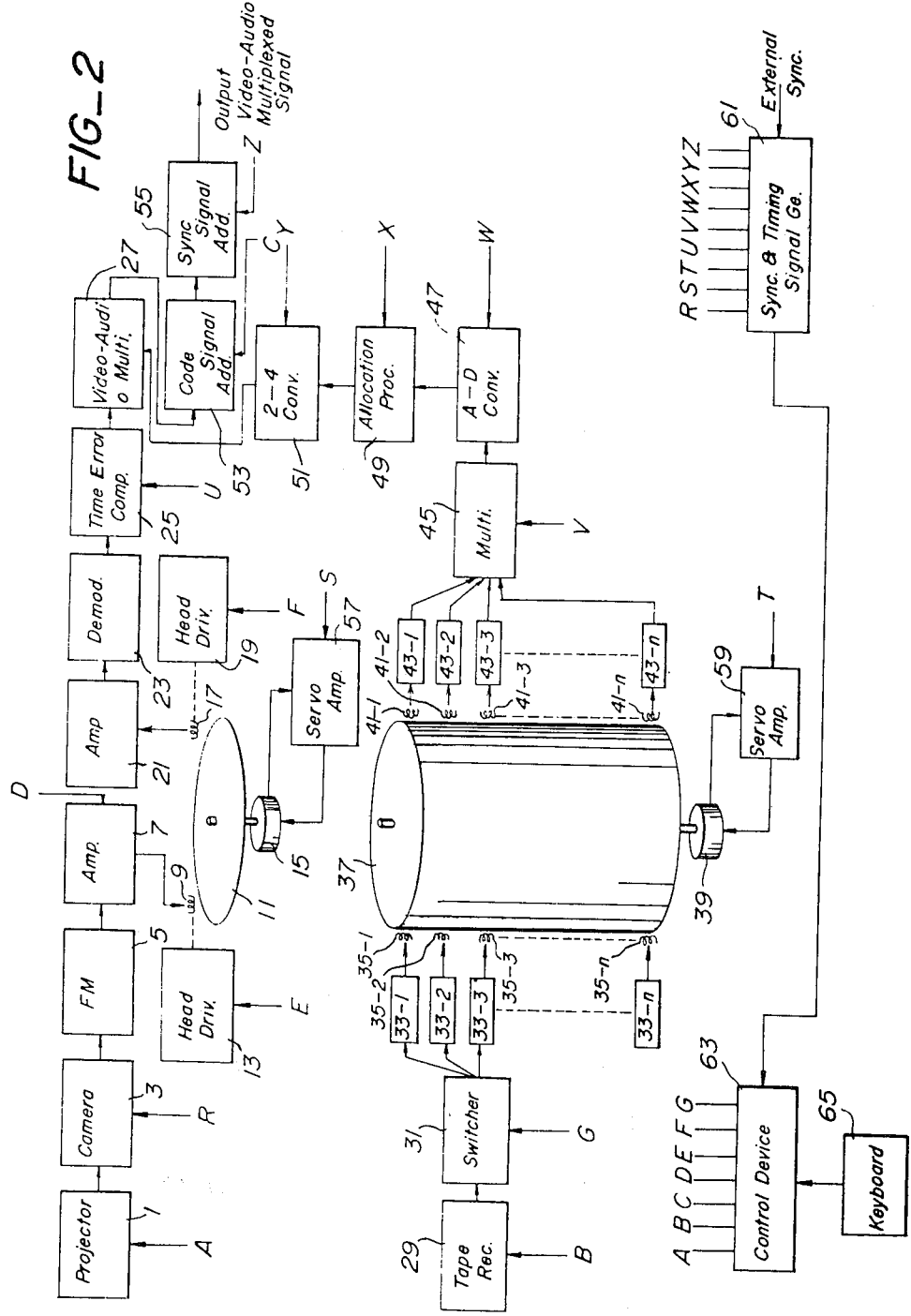

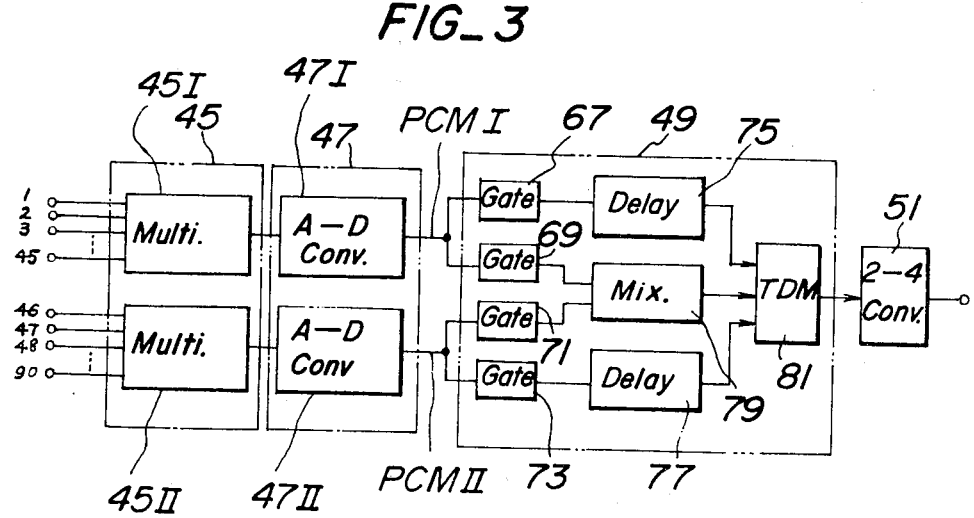
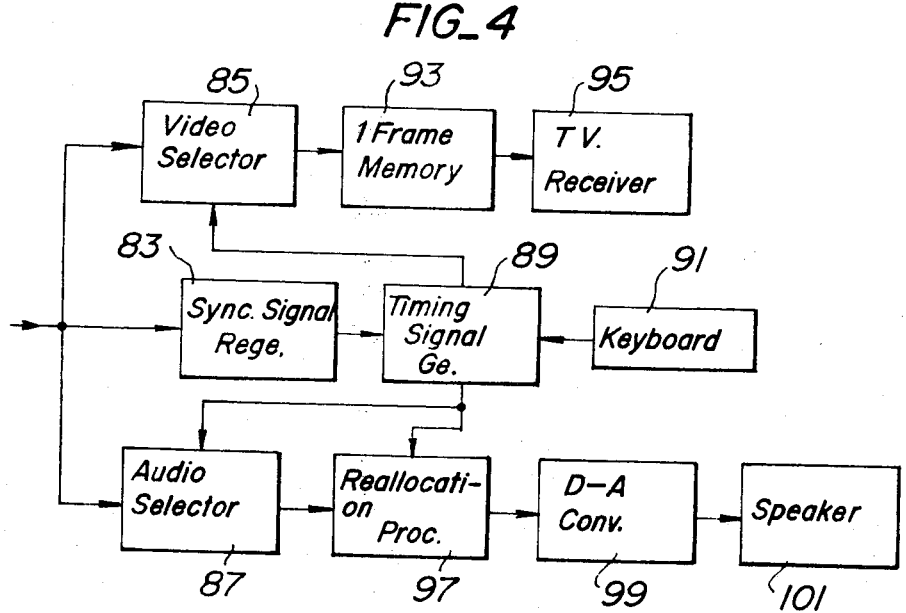

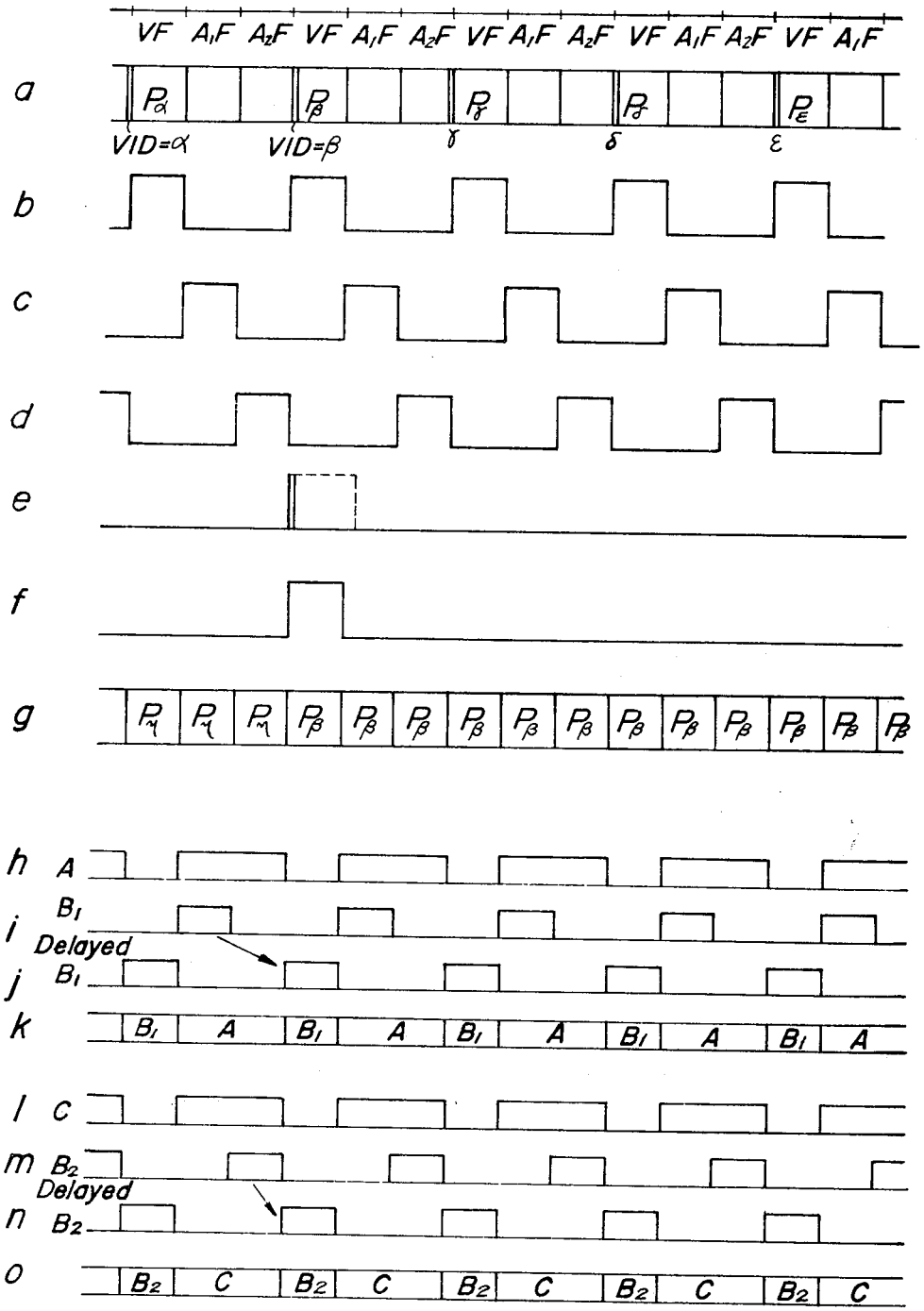
FIG_5

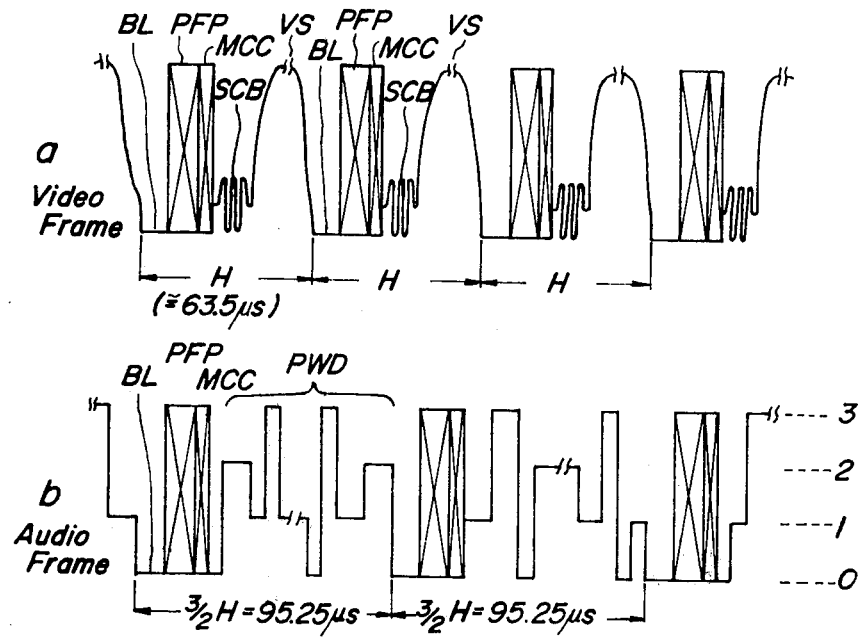
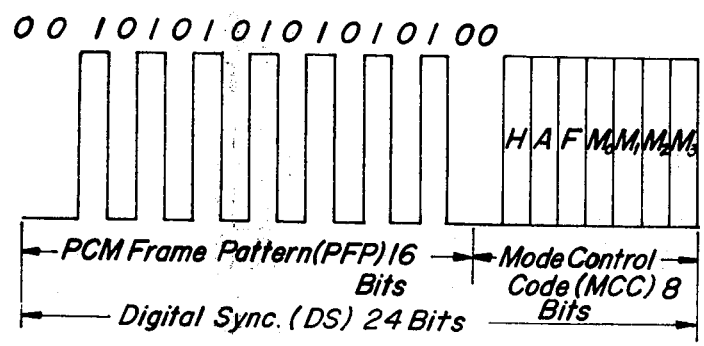

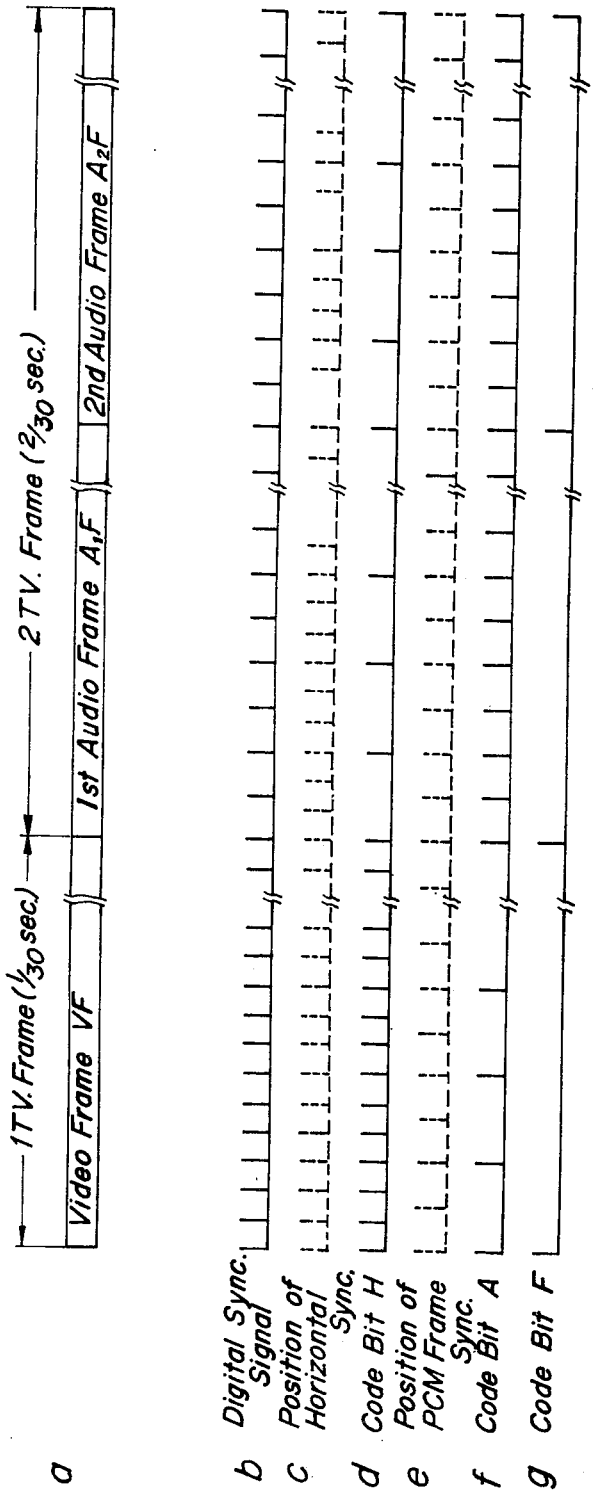

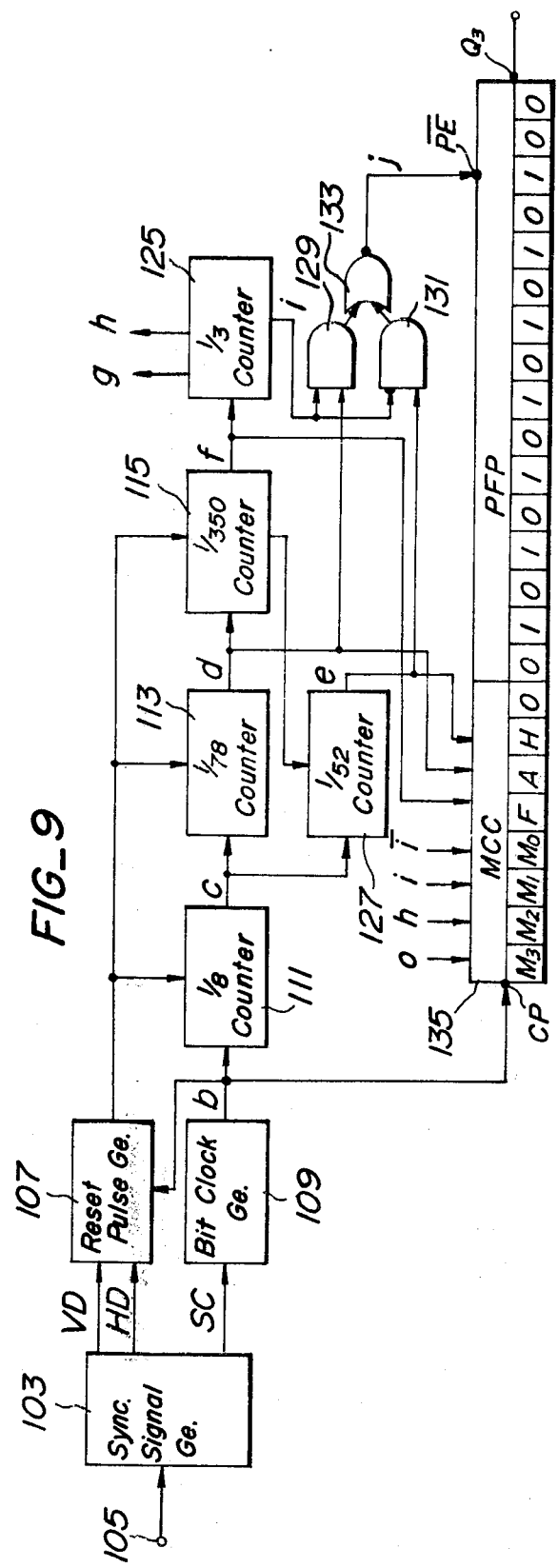
FIG_9

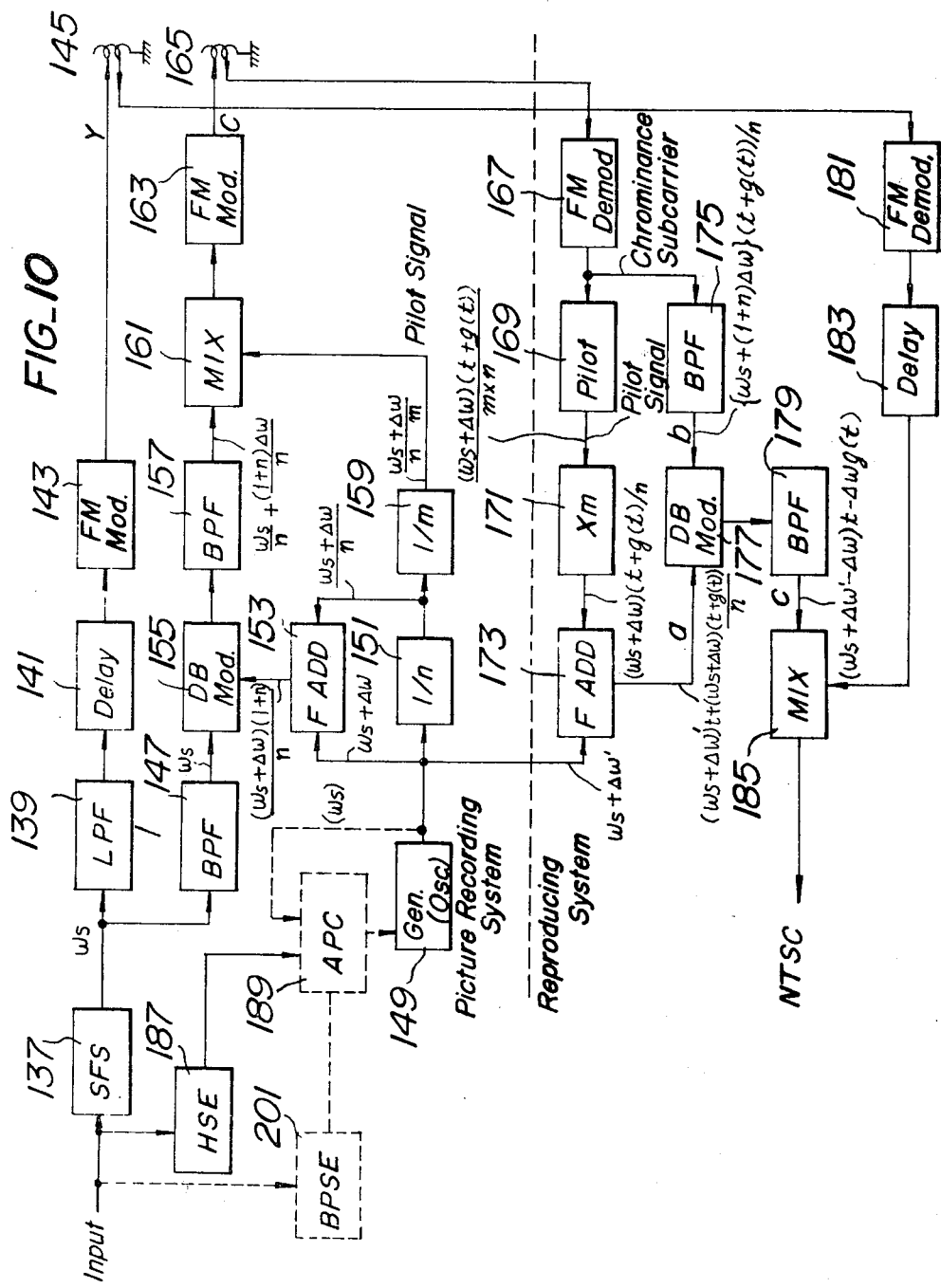

FIG._11
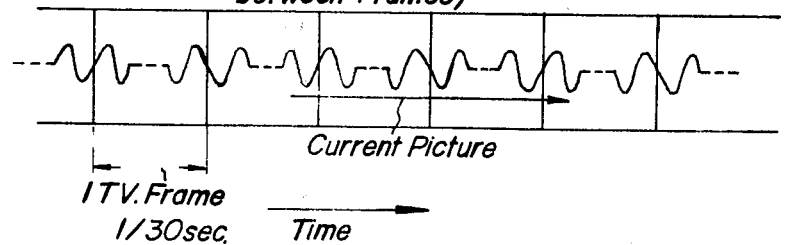
FIG._12
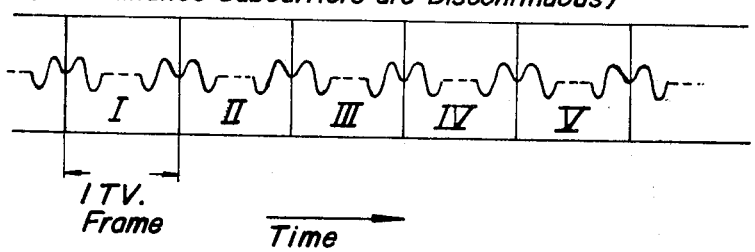
FIG._13
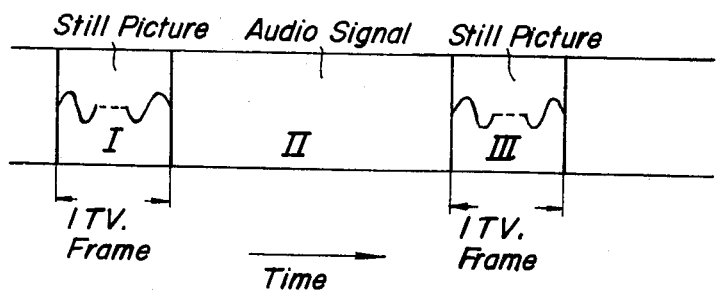

FIG_14
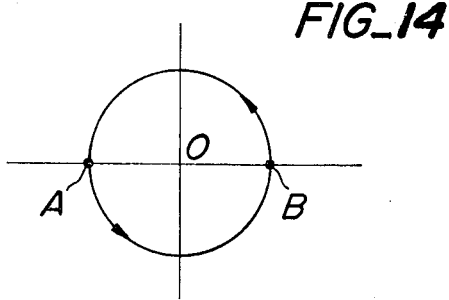
FIG_15
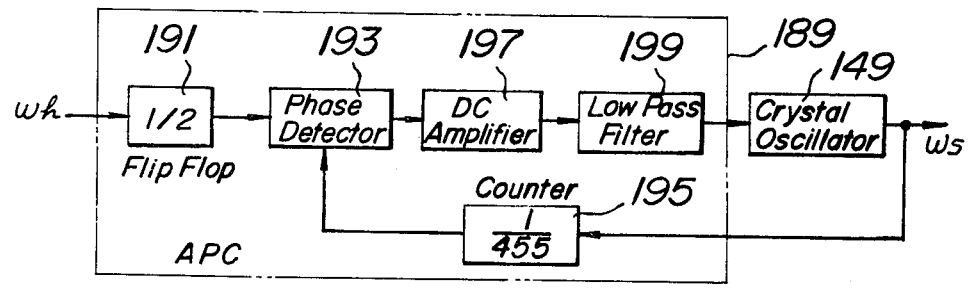
FIG_16
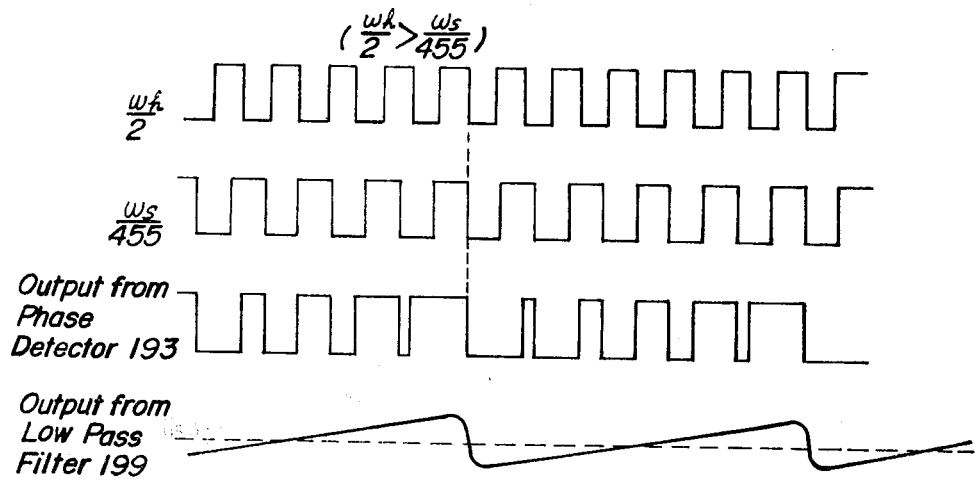

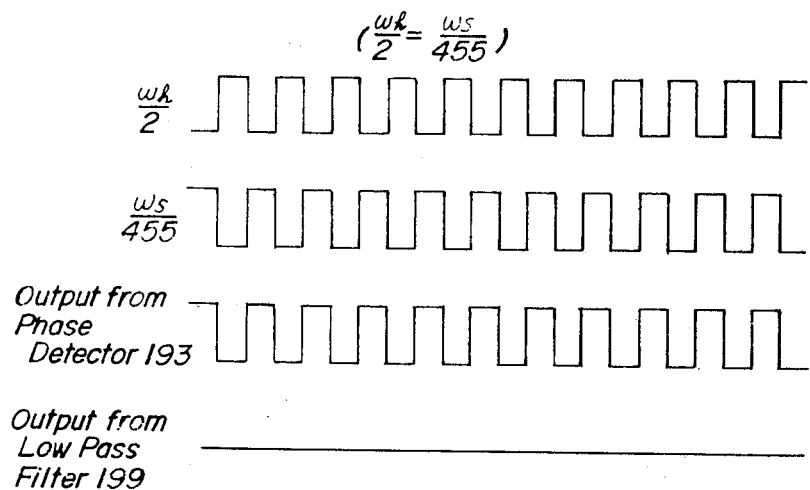
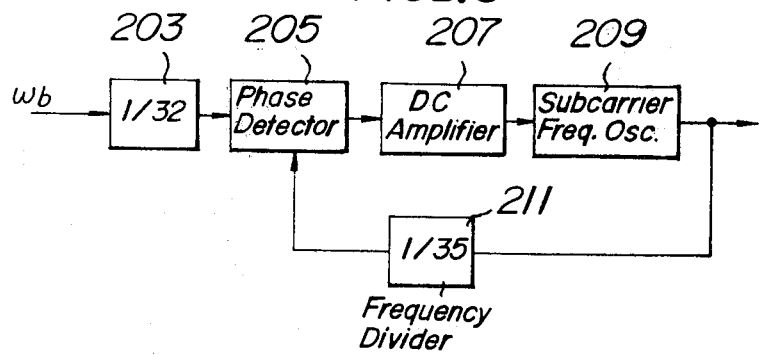

COLOR PICTURE INFORMATION RECORDING AND REPRODUCING SYSTEM

This application is a continuation-in-part of the co-pending application Ser. No. 419,254 filed on Nov. 27, 1973 and now abandoned.

The present invention relates to a color picture information recording and reproducing system for receiving color picture information, recording the information by selection at every frame or field unit, repeatedly reproducing and displaying the color picture signals in the thus selected single frame or field, in a still picture broadcasting system and the like, which transmits still color picture information each having a different content together with audio information accompanied therewith at a period of a frame or field unit similar to the picture frame or field of a television.

In the above described still picture broadcasting system, for example, as described in Takehiko YOSHINO et al. U.S. patent application Ser. No. 361,581 (U.S. Pat. No. 3,854,010), filed May 18, 1973 and assigned to the assignee of the present invention, by means of the same scanning system as used for television, picture information signals and audio information signals accompanied therewith are alternately transmitted at every frame period, which signals are transmitted in an integral ratio to each other. Even if the audio information signals are transmitted by PCM time division multiplexing for increasing transmission efficiency, in the period of the audio frame in which the audio information signals are transmitted, a scanning synchronizing signal is required for the picture signal to be locked in, while in the period of the picture frame in which the picture information signals are transmitted, PCM synchronizing signals such as bit synchronizing and frame synchronizing signals required to PCM transmit the audio signal are locked in. Furthermore, when a plurality of the picture frames are continuous, the phases of the chrominance subcarrier which defines the hue of the color picture signals between these picture frames do not coincide with each other, so that it is difficult to receive these information signals, to extract and record the signals at every frame unit and to repeatedly reproduce them with stability.

Therefore, in a still picture broadcasting system, there has been adopted a transmission system which continuously intersects synchronizing signals of a common waveform, including period information required for each information signal during the periods of both picture and audio frames, to the picture or the audio information signals at a period related to each frame period, as is described in the abovementioned U.S. application Ser. No. 361,581. By adopting such a common synchronizing signal system, in case of reception of a still picture broadcast it is possible to receive, extract with stability with a synchronizing system which is successively and stabilizedly operated, record and reproduce the picture information signals and the audio information signals which are intermittently transmitted respectively.

As an embodiment of such a still picture broadcasting system a basic construction of the transmitting system will be firstly explained with reference to FIGS. 1 to 5. FIG. 1 shows a format of the video-audio multiplexed signal to be transmitted. FIG. 1a denotes a program of 5 seconds. The program is termed as a master frame MF. The master frame MF consists of five sub-frames SF, each of which has a duration of 1 second. As shown in FIG. 1b, each sub-frame SF consists of ten video-audio frames VAF and each video-audio frame VAF has a duration of 1/10 seconds. As illustrated in FIG. 1c, each video-audio frame VAF further consists of a video frame VF of one television frame period (1/30 seconds) and an audio frame AF of two television frame periods (1/15 seconds). Each audio frame AF further consists of a first audio frame $A_1F$ and a second audio frame $A_2F$, each having one television frame period (1/30 seconds). Thus the master frame MF is composed of 150 television frames.

By constructing the master frame MF as mentioned above, in the master frame MF, there may be inserted 50 still pictures. However, in fact, it is necessary to transmit code signals for identifying still pictures and their related sounds and for indicating timings of starts and ends of various signals. It is advantageous to transmit such code signal in the video frames VF rather than in the audio frames AF. In the present embodiment, code signals are transmitted in a video frame VF of each sub-frame SF. A frame during which the code signals are transmitted is referred to as a code frame CF. FIG. 1d shows a part of the sub-frame SF which includes said code frame CF. Therefore, in the master frame MF, there are inserted 45 still pictures and thus it is required to transmit 45 sounds related thereto, i.e., 45 channels of audio-signals.

Sound like speech or music needs several seconds or more to give some meaning, because sound is inherently continuous. In the present embodiment an average duration of each sound relating to each still picture is limited to 10 seconds. As mentioned above the master frame MF has a duration of only 5 seconds, so that in order to transmit sounds of ten seconds it is necessary to use the number of channels twice the number of sound channels. That is in order to transmit sounds of 45 channels relating to 45 still pictures, it is required to establish 90 audio channels. Moreover, it is impossible to transmit audio signals in the video frames VF. Therefore, PCM audio signals must be divided and allocated in the audio frames AF only. In order to effect such an allocation treatment for audio signals, the PCM audio signals of 90 channels are divided into two groups PCMI and PCMII as shown in FIG. 1e. Portions of PCMI corresponding to the second audio frames $A_2F$ and the video frames VF are delayed for two television frame periods of 1/15 seconds and portions of PCMII corresponding to the video frames VF and the first audio frames $A_1F$ are delayed for one television frame period of 1/30 seconds. PCM signals thus delayed form audio channels A and C as illustrated in FIG. 1e. Portions of PCMI and PCMII which correspond to the first audio frames $A_1F$ and the second audio frames $A_2F$, respectively are directly inserted in audio channels $B_1$ and $B_2$ to form an audio channel B. In this manner in the audio channels A, B and C, there are formed vacant frames and these vacant frames correspond to the video frames VF. By effecting such an allocation for the audio signals, in each audio frame AF it is necessary to establish a number of audio channels which is 1½ times of the number of the audio signal channels. In the present embodiment, 135 audio channels have to be provided in each audio frame AF. In this manner, audio signals of 135 channels are inserted in each audio frame AF in the form of PCM signals being allocated in given time slots.

An embodiment of a transmitting apparatus for effecting the above mentioned still picture — PCM audio signal time division multiplexing transmission will now be explained with reference to FIG. 2. The transmitting apparatus comprises a video signal processing system and an audio signal processing system. The video signal processing system comprises a random access slide projector 1, on which is loaded slides of still pictures to be transmitted. The projector 1 projects optically an image of a slide of a still picture onto a television camera 3. The camera 3 picks up the image and produces an electrical video signal. The video signal is supplied to a frequency-modulator 5 which frequency-modulates a carrier by the video signal. The FM video signal is amplified by a recording amplifier 7 and an amplified video signal is supplied to a video recording head 9. This head 9 is an air-bearing type floating head and is arranged to face a surface of a magnetic disc memory 11. The head 9 is driven by a head driving mechanism 13 so as to move linearly in a radical direction above the surface of the disc memory 11. The disc memory 11 is preferably made of a plastic disc having coated thereon a magnetic layer. This kind of memory has been described in detail in an NHK Laboratories Note, Ser. No. 148, "Plated magnetic disc using plastic base"; December, 1971. The disc 11 is rotatably driven by a motor 15 at a rate of 30 rounds per second. There is further provided an air-bearing type floating head 17 for reproducing video signals recorded on the disc memory 11. The reproducing head 17 is also driven by a driving mechanism 19 so as to move linearly in a radical direction above the surface of the disc 11. The magnetic heads 9 and 17 are moved intermittently so that on the surface of the disc 11 there are formed many concentric circular tracks. On each track is recorded the video signal for one television frame period corresponding to each still picture. The reproduced video signal from the reproducing head 17 is supplied to a reproducing amplifier 21 and the amplified video signal is further supplied to a frequency-demodulator 23. The demodulated video signal from the frequency-demodulator 23 is supplied to a time-error compensator 25, in which time-errors of the demodulated video signal due to non-uniformity of rotation of the disc memory 11 can be compensated. The time-error compensator 25 may be a device which is sold from AMPEX Company under a trade name of "AMTEC". The time-error compensated video signal is supplied to a video input terminal of a video-audio multiplexer 27.

The audio signal processing system comprises an audio tape recorder 29 of a remote controlled type. On this tape recorder 29 is loaded a tape on which many kinds of audio signals related to the 45 still pictures have been recorded. The reproduced audio signals from the tape recorder 29 are supplied to a switcher 31 which distributes each audio signal corresponding to each still picture to each pair of recording amplifiers 33-1, 33-2; 33-3, 33-4; . . . 33-n. The amplified audio signals from the amplifiers 33-1, 33-2, 33-3 . . . 33-n are supplied to audio recording heads 35-1, 35-2, 35-3 . . . 35-n, respectively. There is provided an audio recording magnetic drum 37 which is rotated by a driving motor 39 at a rate of one revolution for 5 seconds. As already described above each sound corresponding to each still picture lasts for 10 seconds, so that each audio signal of each sound is recorded on two tracks of the magnetic drum 37 by means of each pair of audio recording heads 35-1, 35-2; 35-3, 35-4; . . . 35-n. That is a first half of a first audio signal for 5 seconds is recorded on a first track of the drum 37 by means of the first recording head 35-1 and then a second half of the first audio signal is recorded on a second track by means of the second head 35-2. In this manner, the successive audio signals corresponding to the successive still pictures are recorded on the magnetic drum 37.

The audio signals recorded on the drum 37 are simultaneously reproduced by audio reproducing heads 41-1, 41-2, 41-3 . . . 41-n, the number of which corresponds to the number of the audio recording heads 35-1, 35-2, . . . 35-n. In the present embodiment $n=90$. The reproduced audio signals are amplified by reproducing amplifiers 43-1, 43-2, 43-3 . . . 43-n. The amplified audio signals are supplied in parallel to a multiplexer 45 in which the audio signals are multiplexed in time division mode to form a time division multiplexed (TDM) audio signal. The TDM audio signal is then supplied to an A-D converter 47 to form a PCM-TDM audio signal. This PCM audio signal is further supplied to an audio allocation processor 49 in which the PCM audio signal is allocated in the audio frames AF as explained above with reference to FIG. 1e. The detailed construction and operation of the audio allocation processor 47 will be explained later. The PCM audio signal supplied from the processor 49 is a two-level PCM signal. This two-level PCM signal is converted in a two-four level converter 51 into a four-level PCM signal. The four-level PCM audio signal is supplied to an audio signal input terminal of the video-audio multiplexer 27. In the multiplexer 27, the video signal from the time-error compensator 25 and the four-level PCM audio signal from the two-four converter 51 are multiplexed in a time division mode. A multiplexed video-audio signal from the multiplexer 27 is supplied to a code signal adder 53 which adds to the multiplexed video-audio signal the code signal for selecting desired still pictures and their related sounds at a receiver end to form the signal train shown in FIG. 1d. The signal train from the code signal adder 53 is further supplied to a synchronizing adder 55 in which a digital synchronizing signal is added to form an output video-audio signal to be transmitted.

In the transmitting apparatus shown in FIG. 2, there are further provided servo amplifiers 57 and 59 so as to maintain constant the rotation of the video disc memory 11 and the audio magnetic drum 37.

In order to transmit the output video-audio signal as a television signal, it is necessary to synchronize the operation of the various portions of the transmitting apparatus with an external synchronizing signal. To this end, there is further provided a synchronizing and timing signal generator 61 which receives the external synchronizing signal and generates synchronizing and timing signals R, S, T, U, V, W, X, Y and Z for the camera 3, the servo amplifiers 57 and 59, the time-error compensator 25, the audio multiplexer 45, the A-D converter 47, the audio allocation processor 49, the two-four level converter 51 and the synchronizing signal adder 55, respectively. The generator 61 further supplies synchronizing and timing signals to a control device 63 which controls selection of still pictures and sounds, recording, reproducing and erasing of video and audio signals, generation of the code signal, etc. The control device 63 further receives instruction signals from an instruction keyboard 65 and supplies control signals A, B, C, D, E, F and G to the projector 1, the audio tape recorder 29, the code signal adder 53, the video recording amplifier 7, the video recording head driving mechanism 13, the video reproducing head driving mechanism 19 and the switcher 31, respectively.

FIG. 3 shows a detailed construction of the audio allocation processor 49. In FIG. 3, there are also shown the multiplexer 45, the A-D converter 47 and the two-four level converter 51. When independent audio signals of 90 channels are to be transmitted, they are divided into two groups each including 45 channels. These audio signals are supplied to a pair of multiplexers 45I and 45II and a pair of A-D converters 47I and 47II, respectively, to form a pair of PCM time division multiplexing signals PCMI and PCMII as shown in FIG. 1e.

The audio allocation processor 49 comprises gates 67, 69, 71 and 73. The signal PCMI is supplied to the gates 67 and 69 and the other signal PCMII is supplied to the gates 71 and 73. To the gate 67 is applied such a gate signal from the synchronizing and timing generator 61 shown in FIG. 2 that the gate 67 is opened for two frame periods $t_0-t_2$, $t_3-t_5$ . . . and closed for one frame period $t_2-t_3$, $t_5-t_6$ . . . in each three frame periods. To the gate 69 is applied a gate signal which has a reverse polarity as that of the gate signal supplied to the gate 67, so that the gate 69 is closed for two frame periods $t_0-t_2$, $t_3-t_5$ . . . and opened for one frame period $t_2-t_3$, $t_5-t_6$ . . . in each three frame periods. The gate 71 is opened for two frame periods $t_1-t_3$, $t_4-t_6$ . . . and closed for one frame period $t_0-t_1$, $t_3-t_4$ . . . in each three frame periods, but delayed for one frame period with respect to the gate 67. The gate 73 is closed for two frame periods $t_1-t_3$, $t_5-t_6$ . . . and opened for one frame period $t_0-t_1$, $t_3-t_4$ . . . in each three frame periods, but delayed for one frame period with respect to the gate 69. construction and constructionand operation of these gates are well-known in the art, so that a detailed explanation thereof is not necessary. To an output of the gate 67 is connected a delay circuit 75 which delays input signals by two frame periods and to an output of the gate 73 is connected a delay circuit 77 which delays input signals by one frame period. A mixing circuit 79 is connected to both outputs of the gates 69 and 71. Output signals of the delay circuits 75 and 77 and the mixing circuit 79 are supplied to a time division multiplexing device 81 to form a time division multiplexed signal.

The signal PCMI is gated out by the gate 67 for a period $t_0-t_2$ and delayed by the delay circuit 75 for two frame periods to form the signal A shown in FIG. 1e. The other signal PCMII is gated out by the gate 73 for a period $t_1-t_3$ and delayed by the delay circuit 77 for one frame period to form the signal C shown in FIG. 1e. Moreover, a signal portion of the PCMI for a period $t_2-t_3$ is gated out by the gate 69 to form the signal $B_1$ shown in FIG. 1e and a signal portion of the PCMII for a period $t_3-t_4$ is gated out by the gate 71 to form the signal $B_2$ also shown in FIG. 1e. The signals $B_1$ and $B_2$ are mixed in the mixing circuit 79 and transferred to the time division multiplexing device 81 as a third channel signal B.

To the time division multiplexing device 81 are also supplied the first and second audio channels A and C to form the PCM-TDM audio signal which is further supplied to the two-four level converter 51.

In the manner mentioned above, it is possible to form a vacant frame for a period $t_1-t_2$ and the video signal can be transmitted in such a vacant frame.

In the transmitting apparatus mentioned above, the random access slide projector 1 is controlled by the control device 63 to project successive 45 still pictures and the video recording head 9 is driven by the mechanism 13 so as to face tracks of the disc memory 11. In this case, the video recording head 7 moves in one direction to face alternate 23 tracks so as to record 23 still pictures and then moves in an opposite direction to face the remaining 22 tracks which situate between the tracks on which the video signals of the first 23 still pictures have been recorded. The video recording amplifier 7 receives a gate signal D of 1/30 seconds from the control device 63 and supplies a recording current to the video recording head 9 for said period. The motor 15 for driving the disc 11 is controlled by the servo amplifier 57 to rotate at a constant angular velocity of 30 rps. The servo amplifier 57 detects the rotation of the disc 11 and controls the motor 15 in such a manner that the detected signal coincides with the timing signal S supplied from the generator 61. The video reproducing head 17 is driven by the mechanism 19 in the same manner as the video recording head 9. The reproducing head 17 is moved in the audio frame and code frame periods and is stopped in the video frame period to reproduce the video signal in a correct manner. The reproducing head 17 repeatedly reproduces the video signal of 45 still pictures.

As already explaind, the audio signal of each sound relating to each still picture is recorded on two tracks of the magnetic drum 37. This drum 37 is driven by the motor 39 and this motor 39 is controlled by the servo amplifier 59. The servo amplifier 59 detects the rotation of the drum 37 and controls the motor 39 in such a manner that the detected signal coincides with the timing signal T supplied from the generator 61.

It is possible to revise a portion of the previously recorded pictures or sounds to new pictures or sounds while reproducing the remaining pictures and sounds. For picture information, the video recording head 9 is accessed to a given track by the head driving mechanism 13 and a new picture is projected by the random access slide projector 1 and picked up by the television camera 3. The video signal thus picked up is supplied to the frequency-modulator 5 and then to the recording amplifier 7. Before recording a d.c. current is passed through the video recording head 9 and the previously recorded video signal is erased. Then the new video signal is recorded on the erased track of the disc 11. For sound information, a new sound is reproduced by the audio tape recorder 29 and a given track of the magnetic drum 37 is selected by the switcher 31. Before recording, the selected track is erased by an erasing head (not shown) corresponding to the selected recording head. These operations are controlled by the control signals supplied from the control device 63 on the basis of the instruction from the instruction keyboard 65 and the timing signals from the generator 61.

Next, a basic construction of a receiver will be explained with reference to FIG. 4. A received signal is supplied in parallel to a synchronizing signal regenerator 83, a video selector 85 and an audio selector 87. In the synchronizing signal regenerator 83, a synchronizing signal is regenerated from the received signal. The synchronizing signal thus regenerated is supplied to a timing signal generator 89. To the timing signal generator 89 is also connected to an instruction keyboard 91. The timing signal generator 89 produces timing signals to the video selector 85 and the audio selector 87 on the basis of the synchronizing signal from the regenerator 83 and the instruction from the keyboard 91. The video selector 85 selects a desired video signal and the audio selector 87 selects a desired audio signal related to the desired video signal. The selected video signal of the desired still picture is once stored in a one frame memory 93. The video signal of one frame period is repeatedly read out to form a continuous television video signal. This television video signal is displayed on a television receiver 95.

The selected audio PCM signal is supplied to an audio reallocation processor 97 to recover a continuous audio PCM signal. The audio PCM signal is supplied to a D-A converter 99 to form an analogue audio signal. This audio signal is reproduced by, for example, a loud-speaker 101.

Now the operation of the receiver will be explained in detail with reference to FIG. 5 showing various waveforms.

In the synchronizing signal regenerator 83, PCM bit synchronizing signals and PCM frame synchronizing signals are reproduced in the manner which will be described later in detail and also gate signals shown in FIGS. 5b, c and d are produced. The timing signal generator 89 detects a picture identification code VID which has been transmitted in a vertical flyback blanking period at a foremost portion of the picture transmission frame period VF. As shown in FIG. 5a, the picture identification code $\alpha$ for the picture P$\alpha$, the picture identification code $\beta$ for the picture P$\beta$ and so on are transmitted at the foremost portions of the picture transmission frame periods VF. The timing signal generator 89 compares the detected picture identification code VID with a desired picture number, for example, $\beta$ instructed by the keyboard 91. If they are identified to each other, the timing signal generator 89 produces a coincidence pulse shown in FIG. 5e. The coincidence pulse is prolonged by a monostable multivibrator circuit as shown by a dotted line in FIG. 5e and the prolonged pulse is gated out by the gate signal shown in FIG. 5b to form a video gate signal illustrated in FIG. 5f. The video gate signal is supplied to the video selector 85 to gate out the video signal P$\beta$ in a desired video frame and the video signal P$\beta$ thus selected is stored in the one frame memory 93. In the memory 93, the video signal P$\beta$ is repeatedly read out so that the continuous video signal shown in FIG. 5g is supplied to the television receiver 95. Thus the television receiver 95 displays the video signal P$\beta$ as a still picture instead of the picture P$\eta$ which has been displayed.

The audio signal is transmitted in the audio frame periods $A_1F$ and $A_2F$ in the form of a PCM multiplexed signal. The timing signal for selecting desired PCM channels corresponding to the desired picture number, for example, $\beta$ is generated by counting the above mentioned PCM bit synchronizing pulses and PCM frame synchronizing pulses. The timing signal thus generated is supplied to the audio selector 87 to select the desired PCM signal related to the selected still picture. FIG. 5h illustrates a pulse series of the audio channel A selected by the audio selector 87 and FIG. 5i shows a pulse series of the audio channel $B_1$ selected by the audio selector 87 and gated out by the gate signal shown in FIG. 5c. The audio reallocation processor 97 supplies the PCM pulse series shown in FIG. 5h directly to the D-A converter 99 and also supplies the PCM pulse series of FIG. 5i to the D-A converter 99, but after delaying by two television frame periods as shown in FIG. 5j. To this end, the timing signal from the generator 89 is supplied to the processor 97. The pulse series shown in FIGS. 5h and 5j are combined to form a continuous pulse series shown in FIG. 5k. The combined PCM signal is converted by the D-A converter 99 into the continuous analogue audio signal.

When the desired sound is transmitted in the channels C and $B_2$, the same operation as above will be carried out as shown in FIGS. 5l, m, n and o to form a desired continuous analogue audio signal. The picture number and the PCM channel number may be correlated to each other in such a manner that even number pictures correspond to the audio channels A and $B_1$ and odd number pictures correspond to the audio channels C and $B_2$.

In an embodiment which will be explained hereinafter an audio sampling frequency, i.e. an audio PCM frame synchronizing frequency is determined as two thirds of a video horizontal synchronizing frequency of 15.75 KHz. Thus the audio sampling frequency is equal to 10.5 KHz. The sampled audio signal is quantized by eight bits and then converted into a four-level PCM signal and transmitted in 156 multiplex time slots with a bit frequency of about 6.54 MHz.

FIG. 6a shows a transmission signal in the still picture transmission period and FIG. 6b illustrates a transmission signal in the sound transmission period. In FIG. 6, a reference BL denotes a blanking pulse, PFP a PCM frame pattern, MCC a mode control code pattern, SCB a color sub-carrier burst signal, VS is a video signal and PWD indicates a four-level PCM audio signal. The PCM frame pattern PFP and the mode control code pattern MCC construct a digital synchronizing signal DS. In the picture transmission period the blanking pulse BL and the digital synchronizing signal DS are inserted at a position corresponding to a horizontal synchronizing signal at a rate of 63.5 $\mu$s and in the sound transmission period are inserted at a rate of the sound sampling period of 95.25 $\mu$s.

FIG. 7 shows a detailed construction of the digital synchronizing signal DS composed of PFP and MCC. The digital synchronizing signal DS is inserted in both the picture and sound transmission periods as the same waveform. In other words the digital synchronizing signal DS has the common waveform for both the video and audio frame periods. The blanking pulse BL is formed by a signal free portion and is used to fix a level of the whole signal. The PCM frame pattern PFP constitutes a given pattern for the PCM frame synchronization of the audio signal and the horizontal synchronization of the video signal. The PCM frame pattern PFP also serves as a timing burst signal TBS for deriving a PCM bit synchronizing signal. For the timing burst signal TBS it is desired to construct the pattern PFP as a regular pattern such as 1010 . . . , but in the present embodiment use is made of a pattern having partially irregular portions such as 00101 . . . 0100, so as to be able to discriminate easily the PCM frame pattern PFP from similar patterns which might occur in the PCM audio signal. The mode control code MCC is a control signal for indicating positions of integer multiples of the horizontal synchronizing period of the video signal and the audio sampling period, positions of the television frame synchronizing signals and kinds of the transmitted signal, i.e., the video signal or the audio signal. As shown in FIG. 7, the mode control code MCC consists of eight code bits O, H, A, F, $M_0$, $M_1$, $M_2$ and $M_3$. The second code bit H indicates coincidence of the horizontal synchronizing signal and the digital synchronizing signal, the third code bit A coincidence of the sound sampling signal and the digital synchronizing signal, the fourth code bit F the television frame synchronizing signal and the remaining code bits $M_0$, $M_1$, $M_2$ and $M_3$ represent kinds of transmitted signal. The code bits $M_0$0, 1, $M_2$, $M_3$ become 1, 0, 0, 0 in the picture transmission period, 0, 1, 0, 0 in the first audio frame $A_1F$ and 0, 1, 1, 0 in the second audio frame $A_2F$.

FIG. 8a shows a portion of the still picture-sound multiplexed signal, FIG. 8b a timing of transmission of the digital synchronizing signal, FIG. 8c imaginary positions of the horizontal synchronizing signal, FIG. 8d the second code bit H in the mode control code MCC, FIG. 8e imaginary positions of the PCM frame synchronizing signal, FIG. 8f the third code bit A in the mode control code MCC and FIG. 8g illustrates the fourth code bit F in the mode control code MCC. The second code bit H is at a logic level "1" when a timing of the digital synchronizing signal DS coincides with that of the horizontal synchronizing signal and is a logic level "0" when a transmission timing of these synchronizing signals does not coincide with each other. Thus as shown in FIG. 8d, in the picture transmission period, i.e., in the video frame VF the code bit H is always at a logic level "1", but in the sound transmission periods, i.e., in the audio frame AF, alternate mode control codes MCC correspond to positions of the horizontal synchronizing signals as shown in FIG. 8b and c, so that alternate code bits H become a logic level "1" as illustrated in FIG. 8d.

The third code bit A in the mode control code MCC is at a logic level "1" when a timing of the sound sampling signal coincides with the digital synchronizing signal DS and is at a logic level "0" when they do not coincide with each other. Therefore, in the sound transmission period, the third code bit A is always at a logic level "1", but in the picture transmission period becomes a logic level "1" once for each three audio sampling periods as shown in FIG. 8f.

The above mentioned digital synchronizing signal DS is generated by the synchronizing and timing signal generator 61 shown in FIG. 2. FIG. 9 shows an embodiment of a device for generating the digital synchronizing signal DS, which device forms a part of the synchronizing and timing signal generator 61. The device comprises a synchronizing signal generator 103 which is the same as that used in an ordinary television apparatus and produces a vertical driving signal VD, a horizontal driving signal HD and a color sub-carrier SC. The television camera 3 shown in FIG. 2 is driven by these signals. As the case may be, the synchronizing signal generator 103 may be locked with an external synchronizing signal or a video and synchronizing composite signal supplied to an input terminal 105. The horizontal and vertical driving signals HD and VD are supplied to a reset pulse generator 107. The reset pulse generator 107 produces reset pulses for counters 111, 113 and 115 at a starting instance of the video frame VF so that a phase of the synchronizing signal of the video signal coincides with that of the digital synchronizing signal DS. By this measure the synchronizing signal of the video signal is phase-locked with the digital synchronizing signal, and as the result thereof the video signal and the audio PCM signal can be transmitted in a time division multiplexing mode as shown in FIG. 1d. The device shown in FIG. 9 further comprises a bit clock generator 109 which receives the color sub-carrier SC from the synchronizing signal generator 103 and produces bit clocks of 6.54 MHz corresponding to 64/35 times of the color sub-carrier frequency of 3.58 MHz.

In FIG. 9, the bit clocks b from the bit clock generator 109 are supplied to the counter 111 which counts down the bit clocks by ⅛ to produce a signal c having a time slot frequency of 0.81 MHz for the PCM-TDM signal. The output signal c from the counter 111 is further supplied to the counter 113 which counts down the signal c by 1/78 to produce a signal d having the sound sampling frequency of 10.489 KHz. The output signal d from the counter 113 is further supplied to the counter 115 which counts down the signal d by 1/350 to produce a signal f having the television frame frequency of 30 Hz. The output signal f from the counter 115 is further supplied to a counter 125 which counts down the signal f by ⅓ to produce a signal i of the video-audio frame frequency of 10 Hz. The output signal c from the counter 111 is further supplied to a counter 127 which counts down the signal c by 1/52 to generate a signal e of the horizontal synchronizing signal frequency of 15.734 KHz. The counter 127 is reset by the output signal from the counter 115 at a rate of 1/30 seconds so as to maintain a given phase relation between the output signals d, f and e from the counters 113, 115 and 127.

The counter 125 consists of three stage flip-flops and produces an output signal g corresponding to a first bit from the first stage and also an output signal h corresponding to a second bit. The signal g is at a logic level "1" during the first audio period $A_1F$ and the signal h is at a logic level "1" during the second audio frame $A_2F$. These output signals g and h are supplied to an OR gate to form a logical sum signal i which signal i is at a logic level "1" during the audio frame period.

In FIG. 9, the output signal d of the sound sampling frequency from the counter 113 and the output signal i of 10 Hz from the counter 125 are supplied to an AND gate 129. Thus the gate 129 passes the sound sampling signal d during only the audio frame period. The output signal i from the counter 125 and the output signal e from the counter 127 are supplied to an inhibition gate 131 which passes the horizontal synchronizing signal e of 15.734 KHz only when the signal i from the counter 125 is at a negative level. The output signals from the AND gate 129 and the inhibition gate 131 are supplied to a NOR gate 133 which makes a logical sum signal j of these signals in the reverse polarity and supplies the signal j to a parallel enable input $\overline{PE}$ of a shift register 135.

When color picture signals of a system similar to the NTSC color television system are transmitted as the above described picture information signal, these signals are received and extracted; thus, extracted signals are selected at every picture frame unit and recovered in a memory device such as a magnetic disc frame memory device and the color picture signals in the single frame thus recorded are repeatedly reproduced and displayed. However, in this case it is necessary to make the phases of the chrominance subcarriers between the repeatedly reproduced adjacent picture frames continuous and to avoid the occurrence of the hue distortion of the color picture due to the unevenness of rotation of the disc memory device.

As a suitable method of eliminating color distortion of the color picture due to a mechanical time distortion of the recording device such as the unevenness of rotation of the disc of the disc memory device or the unevenness of running speed of the tape of the magnetic tape picture recording device, there is a recording and reproducing method using a pilot system in which color picture signals to be recorded together with pilot signals having a certain frequency are recorded on the recording medium in parallel or by mixing and during reproduction the time distortions included in the reproduced color picture signals are cancelled with the corresponding time distortions included in the pilot signals with reference to the pilot signals reproduced at the same time as the color picture signals so as to completely eliminate the hue distortion due to the unevenness of revolution or running speed of the recording medium of the recording device. In this case it is necessary to provide means for producing the pilot signals having a stable and constant frequency at the receiving and recording side.

However, when conventional color television picture signals are recorded with the use of a pilot system and reproduced as a current picture, the phases of the reproduced chrominance subcarriers are naturally continuous between the adjacent picture frames, so that it is sufficient to maintain the frequency of the pilot signals to a value that the chrominance subcarriers reproduced with reference to the pilot signals have a relation of frequency interleaving between the adjacent picture frames and it is unnecessary to precisely coincide the frequency of the reproduced chrominance subcarriers with the frequency of the received chrominance subcarriers. On the contrary, when color pictures signals in a single frame are repeatedly reproduced as in the reception of the still picture broadcast or in the still reproduction of the television picture, in order to avoid the occurrence of the color distortion (hue distortion) it is necessary to establish the frequency of the pilot signals so as to coincide the frequency of the reproduced chrominance subcarriers with the frequency of the chrominance subcarriers of incoming signals, so that the phases of the reproduced chrominance subcarriers between adjacent picture frames are continuous at the end and at the beginning of each picture frame and a relation of frequency interleaving is maintained between repeatedly reproduced adjacent picture frames.

It is an object of the present invention to provide a color picture information recording and reproducing system in which color picture signals of any one frame or field selected from a series of plurality of frames or fields of NTSC color picture signals recorded with the use of a pilot system may be repeatedly reproduced without color distortion.

It is another object of the invention to provide a color picture information recording and reproducing system in which color picture signals intermittently transmitted at every frame or field unit may be recorded with the use of a pilot system and repeatedly reproduced without color distortion.

It is another object of the invention to provide a color picture information recording and reproducing system wherein in the reception of a still picture broadcast in which color picture signals with the use of a system similar to the NTSC system are intermittently transmitted at every frame or field unit and synchronizing signals such as horizontal synchronizing signals, etc. included in the color picture signals are continuously transmitted, the pilot signals are formed so as to reproduce chrominance subcarriers having a frequency which is completely synchronized with that of the incoming chrominance subcarriers by means of the continuous synchronizing signals, and picture recording and reproducing with the use of the pilot system may be performed at every frame or field unit by means of the pilot signals without color distortion.

According to the color picture information recording and reproducing system of the invention, in order to receive, selectively record, repeatedly reproduce and display color picture information which is intermittently transmitted a plurality of different color picture information signals together with other information signals including a synchronizing signal having a frequency which is in a certain relation with that of chrominance subcarriers of the color picture information signals, the system comprises a recording device for selectively recording the color picture information and a pilot signal generator. The generator is controlled by comparing outputs thereof with the received synchronizing signals. The pilot signals having a frequency which is in a certain relation with that of the chrominance subcarriers are formed from outputs of the generator and the received color picture signals are recorded in the recording device together with the pilot signals.

These and other objects and advantages of the invention will be seen by reference to the description, taken in connection with the accompanying drawings, in which:

FIGS. 1a, 1b and 1c show constructions of a master frame, a sub-frame and a video-audio frame of video and audio signals transmitted by a time division multiplexing transmission system, FIG. 1d illustrates a portion of said signal which includes a control frame and FIG. 1e shows a manner of effecting an audio PCM signal allocation;

FIG. 2 illustrates diagrammatically a basic construction of an embodiment of a transmitter;

FIG. 3 is a block diagram showing a detailed construction of an audio allocation processor shown in FIG. 2;

FIG. 4 is a block diagram showing a principle construction of a receiver;

FIG. 5 shows waveforms for explaining the operation of the receiver shown in FIG. 4;

FIG. 6a illustrates a waveform of the transmitted signal in a video frame period and FIG. 6b shows a waveform of the transmitted signal in an audio frame period;

FIG. 7 depicts a waveform of a digital synchronizing signal consisting of a PCM frame synchronizing pattern and a mode control code;

FIG. 8a shows a portion of the video-audio signal, FIG. 8b a timing of transmission of the digital synchronizing signal, FIG. 8c imaginary positions of the horizontal synchronizing signal, FIG. 8d a first code bit H in the mode control code, FIG. 8e imaginary positions of the PCM signal, FIG. 8f a second code bit A in the mode control code and FIG. 8g illustrates a third code bit F in the mode control code;

FIG. 9 is a block diagram showing an embodiment of a digital synchronizing signal generating device;

FIG. 10 is a block diagram showing a construction of a color picture information recording and reproducing system according to the invention and also a principle construction of a YC separation pilot system;

FIG. 11 shows a waveform of a current picture in which chrominance subcarriers are continuous between frames;

FIG. 12 illustrates a waveform of a still picture in which chrominance subcarriers are discontinuous between frames;

FIG. 13 shows a waveform of a still picture including audio signals;

FIG. 14 illustrates a function of phase jumping or rotation of the chrominance subcarriers;

FIG. 15 is a block diagram showing an embodiment of an APC circuit used in the system according to the invention;

FIGS. 16 and 17 show waveforms for explaining timing of the APC circuit shown in FIG. 15; and FIG. 18 is a block diagram showing another embodiment of the APC circuit used in the system according to the invention.

Referring now to FIG. 10, a solid line shows the principal construction of one embodiment of a color picture signal recording and reproducing device operated by separating a luminance signal component from a color signal component by a pilot system.

In case of recording conventional color television picture signals by a pilot system with the use of a magnetic recording and reproducing device, as shown in FIG. 10, any one frame or field period is extracted by a single frame or field selector circuit 137. The color picture signals of the output of the frame or field selector circuit 137 are separated into a luminance signal component and carrier chrominance signal component by means of a low pass filter 139 and a band pass filter 147, and the luminance signal component is recorded on a record carrier (not shown) by a head 145 for the luminance signal through a delay circuit 141 and an FM modulator 143, while the color signal component is supplied to a double balanced modulator 155 together with the frequency sum component of a frequency adder 153. The output of the frequency adder 153 is formed by adding the color subcarrier frequency oscillation output of a reference signal crystal oscillator 149 and the output of a 1/n frequency divider 151, to which the output of the oscillator 149 is supplied. The subcarrier frequency of the output of the oscillator 149 is converted into 1/n frequency thereof by the modulator 155 and applied to a mixer 161 through a band pass filter 157. To the mixer 161 is applied the 1/(n·m) frequency component of a pilot signal obtained from a 1/m frequency divider 159, to which the 1/n frequency component of the 1/n frequency divider 151 is supplied. The output of the mixer 161 is applied to an FM modulator 163. Thus the obtained FM signal output of the FM modulator 163 is recorded on a record carrier (not shown) by a magnetic head 165 for the color signal. The 1/n and 1/m frequency dividers 151 and 159 are, for example, constructed with a combination of a plurality of four bits counters and AND gates for setting up a frequency dividing ratio and the frequency adder 153 is constructed with a combination of a double balanced moculator and a band pass filter so as to form a signal having a frequency which is the sum of frequencies of two input signals. In the case of reproducing the signal recorded as described above, the FM reproduced signal picked up by the head 165 is supplied to an FM demodulator 167, the demodulated output of which is supplied to an m frequency multiplier 171 through a pilot signal extracting circuit 169 which is composed of a pilot signal frequency resonance circuit and extracts the 1/(n·m) frequency component of the pilot signal. The 1/n frequency component of the m frequency multiplier and the chrominance subcarrier frequency oscillation output of the oscillator 149 are supplied to a frequency adder 173 to obtain the frequency sum signal component $a$. The output of the FM demodulator 167 also is supplied to a band pass filter 175 to obtain the subcarrier chrominance signal component $b$. The frequency sum signal component $a$ and the subcarrier chrominance signal component $b$ are supplied to a double balanced modulator 177, in which the converted chrominance subcarrier frequency is again converted into the original frequency. The original chrominance subcarrier frequency output of the modulator 177 is supplied to a band pass filter 179 to obtain the reproduced carrier color signal component $c$. The FM reproduced output from the head 145 is supplied to an FM demodulator 181 and the demodulated output of the demodulator 181 is supplied to a delay circuit 183 to obtain a reproduced luminance signal component having a phase which is adjusted for the chrominance signal component. The reproduced signal component $c$ and the reproduced luminance signal component are supplied to a mixer 185 to obtain a reproduced NTSC system color picture signal.

As will be described hereinafter, in the reception of a conventional television broadcast, in the case of recording a current picture in which chorminance subcarriers are continuous between frames as shown in FIG. 11 by a pilot system and of reproducing it as a current picture, the oscillation frequency of the reference signal crystal oscillator 149 shown in FIG. 10 makes no trouble even if it is not frequency locked with the chorminance subcarrier (frequency 3.58 MHz) of the incoming color picture signal, but it is preferable to use the crystal oscillator having a nominal frequency of 3.58 MHz only. In the case of extracting, recording, repeatedly reproducing and displaying as a still picture signal only a single frame from a current picture in which chrominance subcarriers are continuous between adjacent frames or fields or in the case of the reception of a still picture broadcast constructed as shown in FIGS. 12 and 13, i.e., in the case of recording, repeatedly reproducing and displaying the color picture signals in a frame or field unit, it is necessary to precisely frequency lock the frequency of the output of the signal generator such as the reference signal oscillator with the frequency of the chrominance subcarrier of the incoming color picture signals.

That is, in the still picture broadcasting system in which the color picture information in a frame or a field unit is intermittently transmitted, continuity of the chrominance subcarriers between picture frames or fields is not ensured, so that even if the chrominance subcarrier oscillator for a burst lock used in a conventional television broadcasting receiver is used, it is impossible to pull the phase of said oscillator in the phase of the incoming chrominance subcarrier at an instant when a desired picture frame arrives.

In the present invention, at the time of recording the color picture signal, signals having the same frequency as that of the input signals of the chrominance subcarrier are formed so as to make the frequency of these signals the original oscillation of the pilot signals for picture recording, at the transmitter side the synchronizing signals having a frequency which is at a certain relation with that of the chrominance subcarrier are transmitted, and at the receiver side the synchronizing signals are received so as to obtain an oscillation output of the chrominance subcarrier frequency, a pilot signal for picture recording is made therefrom, the pilot signal is mixed with a color picture signal to be recorded and the thus mixed signal is recorded on the record carrier.

As described in the foregoing, in the picture recording of a conventional color current picture by the pilot system, the crystal oscillator for the reference signal is used by free running instead of frequency locking with the input chorminance subcarrier. First, this feature is explained. An angular frequency at the time of recording the oscillation output of the crystal oscillator 149 shown in FIG. 10 is made $\omega_s+\Delta\omega$, and an angular frequency at the time of reproducing the oscillation output of the crystal oscillator 149 is made $\omega_s+\Delta\omega'$. Here, $\omega_s$ is an angular frequency of an input chrominance subcarrier, and $\Delta\omega$, $\Delta\omega'$ express diviations from $\omega_s$, respectively.

As shown in the figure, the angular frequency of the carrier input signals of the double balanced modulator 155 at the recording side becomes the abovementioned frequency sum component $$(\omega_s+\Delta\omega) \times \left(\frac{1+n}{n}\right),$$

and then the angular frequency of the frequency converted carrier color signals to be recorded becomes $\{\omega_s + (1+n)\Delta\omega\} \times (1/n)$. At the same time, the angular frequency of the pilot signal for picture recording becomes $$(\omega_s+\Delta\omega) \times \frac{1}{n \times m}$$

and this pilot signal is recorded together with the carrier color signal and used as jitter correction of the carrier color signal caused by time distortion of the recording device at the time of reproduction.

When recording these signals on, for example, a magnetic disc for one frame memory, if the time base jitter generated in the reproduced carrier signal is made $g(t)$, $$\{\omega_s+(1+n)\Delta\omega\}(t+g(t))\times \frac{1}{n} \text{ and } (\omega_s+\Delta\omega)(t+g(t))\times \frac{1}{n\times m},$$

the phases of the frequency converted carrier color signal $b$ and the pilot signal at the time of reproduction become respectively. Further, the phase of the carrier input signal $a$ of the double balanced modulator 177 at the reproduction side shown in FIG. 10 becomes $(\omega_s + \Delta\omega')t+(\omega_s + \Delta\omega)(t+g(t))\times(1/n)$ and if the frequency difference between signals $a$ and $b$ is taken by the double balanced modulator 177, the phase of the frequency reconverted carrier color signal $c$ finally becomes $(\omega_s + \Delta\omega' - \Delta\omega)t - \Delta\omega g(t)$. In a common domestic recording device, if $g(t) = 1$ $\mu s$ and the frequency error of the crystal oscillator is made $10^{-5}$, i.e., $\Delta\omega+2\pi \times 3.58$ (MHz) $\times 10^{-5}$, the phase jitter of the reproduced carrier color signal becomes $\Delta\omega\cdot g(t) = 2\pi\times3.58\times10^{-5}$ radians, which may be ignored. That is, the angular frequency of the chrominance subcarrier at the time of reproduction is converted into $\omega_s+\Delta\omega'-\Delta\omega$ having no jitter.

In the case of using the pilot system for recording and repeatedly reproducing a single frame color picture signal in the still picture broadcasting, $\Delta\omega=0$, i.e., the crystal oscillator 149 must be frequency locked with the frequency of the input chorminance subcarrier. The reason thereof is explained hereinafter. When $\omega_s$ is an angular frequency of the normal chrominance subcarrier, it can be expressed by $\omega_s = 455 \times \frac{1}{2} \times \omega_h = 455 \times \frac{1}{2} \times 525$ $\omega_f$, in which $\omega_h$ and $\omega_f$ are a horizontal synchronizing angular frequency and a frame angular frequency, respectively. In this case, the phase rotation in one frame period of the chrominance subcarrier angular frequency $\omega_s$ becomes $2\pi\times455\times525\times\frac{1}{2}$ radians. Here, considering the phase rotation of the chrominance subcarrier at the repeated reproduction of the signal of a single frame, as shown in FIG. 14, in case of returning the phase from the point A at the end of one frame to the point B at the start of the same frame, there is generated a phase jump of $2\pi - \{2\pi\times455\times525\times\frac{1}{2}(\text{mod } 2\pi)\}=\pi$ radians. On the other hand, if $\omega_s$ is shifted by $\omega_f$, its phase is shifted $2\pi$ radians in one frame period as compared with the normal case. In general, the phase jump between the picture frames when $\omega_s$ is $\omega_s + \Delta\omega$ becomes as follows.

$$2\pi-\left\{\left(2\pi\times455\times525\times\frac{1}{2}+2\pi\frac{\Delta\omega}{\omega_f}\right)\right\} \text{ (mod } 2\pi\text{) radians}$$

In the same manner, the phase jump between adjacent picture frames of the angular frequency $\{\omega_s+\Delta\omega(1+n)\}\times(1/n)$ of the frequency converted chrominance subcarriers at the time of recording is as follows.

$$2\pi-\left\{\left(2\pi\times455\times525\times\frac{1}{2n}+2\pi\frac{\Delta\omega}{\omega_f}\times\frac{1+n}{n}\right)\right\}(\text{mod } 2\pi) \text{ radians} \quad (1)$$

while the phase jump between picture frames of th pilot signals becomes as follows.

$$2\pi-\left\{\left(2\pi\times455\times525\times\frac{1}{2nm}\right)+2\pi\frac{\Delta\omega}{\omega_f}\times\frac{1}{n\cdot m}\right\}(\text{mod } 2\pi)$$

Accordingly, the phase jump between frames of the pilot signals which are frequency multiplied by m becomes as follows.

$$2\pi-\left\{\left(2\pi\times455\times525\times\frac{1}{2n}\right)+2\pi\frac{\Delta\omega}{\omega_f}\times\frac{1}{n}\right\}(\text{mod } 2\pi) \text{ radians} \quad (2)$$

Thus, there is formed a frequency sum of the frequency multiplied signal and the oscillation output continuous wave of the angular frequency $\omega_s+\Delta\omega'$, but since one of them is a continuous wave, the phase jump between adjacent picture frames remains as it is. In the end, the phase jump between frames for the final balanced modulator output is the equation (2) — the equation (1) and it becomes as follows.

$$\left(2\pi \times \frac{\Delta\omega}{\omega_f}\right) \pmod{2\pi} \text{ radians} \tag{3}$$

That is, the finally reproduced chrominance subcarriers, i.e., the carrier chorminance signals generate the phase jump shown in the equation (3) between the adjacent picture frames. In order to prevent the occurence of this phase jump, as understood from the equation (3), it is preferable to make $\Delta\omega$ multiplication by an integer of $\omega_f(30 \times k)$, wherein $k$ is an optional integer, but in a conventional crystal oscillator, it is difficult to maintain the accuracy of such frequency. Therefore, it is ncessary to keep $\Delta\omega=0$. In the present invention, as shown in FIG. 10, the crystal oscillator 149 is controlled by a control means so as to frequency-lock the output of the crystal oscillator with the synchronizing signal component included in the incoming color picture signals. The control means comprises a horizontal synchronizing extractor circuit 187 for extracting horizontal synchronizing signals and an automatic phase control (APC) circuit 189. The automatic phase control circuit 189 controls the crystal oscillator 149 by comparing the output of the oscillator 149 with the horizontal synchronizing signal component included in the incoming color picture signals. Accordingly, in the present invention, the frequency component of the chrominance subcarrier signal is extracted from the signal having a frequency which is in a certain relation to that of the chrominance subcarrier, for example the horizontal synchronizing signal $$\left(\omega_s - \frac{455\omega_h}{2}\right),$$

and an oscillator output which is frequency locked with the thus extracted component is used as the original oscillation of the pilot signal for picture recording and reproducing and then with the use of this pilot signal, one frame color picture signal is recorded and reproduced by the pilot system. FIG. 15 shows an embodiment of the APC circuit 189 for providing the oscillator which is frequency locked with the chrominance subcarrier of the incoming color picture signal according to the present invention. The signal having the frequency component of the horizontal synchronizing timing $\omega_h$ is extracted from the still picture input signal; the thus extracted signal is made $\omega_h/2$ by supplying it to a frequency divider or a flip-fop circuit 191 and the output of the circuit 191 is supplied to one input of a phase detector 193. The output of the crystal oscillator 149 is frequency divided to $\omega_s/455$ by a counter 195, and the output of the counter 195 is supplied to the other input of the phase detector 193. An output of the phase detector 193 is supplied to a variable capacitor (not shown) of the crystal oscillator 149 through a DC amplifier 197 and a low pass filter 199, so as to convert its oscillation frequency. FIG. 16 is an explanatory view showing timings of each portion of the APC circuit 189 shown in FIG. 15 when $$\frac{\omega_h}{2} > \frac{\omega_s}{455}.$$

A saw-tooth voltage output of the low pass filter 199 is also supplied to the variable capacitor for determining the oscillation frequency of the crystal oscillator 149, and this saw-tooth voltage controls oscillation frequency of the crystal oscillator 149, so that if a desired frequency is within the frequency controlling range, the frequency locking is easily possible. FIG. 17 is an explanatory view showing timings of each portion of the circuit 189 shown in FIG. 15 when $$\frac{\omega_h}{2} = \frac{\omega_s}{455}$$

i.e. frequency locking.

Another embodiment of the APC circuit in the case of using the other synchronizing signal instead of the horizontal synchronizing signal in the present invention is shown in FIG. 10 by the dotted line and also shown in FIG. 18. When using a composite signal multiplied with an audio signal by pulse code modulation as an audio signal in the period II in the picture information signals containing the still picture signal and the audio signal as shown in FIG. 13, it is necessary to reproduce PCM bit synchronizing signals (angular frequency $\omega_b$) for reproducing the audio signal. This bit synchronizing signal is transmitted under a certain frequency relation to the subcarrier signal (for example, the signals of the same oscillator are suitably multiplied or divided). The PCM bit synchronizing signals are extracted by a bit pulse synchronizing extractor circuit 201.

If the frequency of this bit synchronizing signal is put in a relation of 35:32 (about 3.27 MHz) to the subcarrier frequency (about 3.58 MHz), the APC circuit constructed as shown in FIG. 18 can be used.

In FIG. 18, a reference numeral 203 denotes a 1/32 frequency divider, 205 a phase detector, 207 an amplifier for amplifying the D.C. component of the subcarrier detection output, a reference 209 is an oscillator for generating the subcarrier frequency, and a reference 211 indicates a 1/35 frequency divider.

The operation of this APC circuit is principally the same as the embodiment shown in FIG. 15, except that the frequency of the signal as the basis of the phase is about 3.27 MHz, and hence a subcarrier which phase is fixed can be obtained by using this APC circuit.

As described in detail, in the reception of the still picture broadcast, when the picture recording and reproducing with the use of a one frame memory device by the pilot system is employed, if the time division transmission system of the picture and the second is employed, it is necessary to complete a recording treatment during any one of the selected picture frame periods, so that in a conventional burst lock chrominance subcarrier oscillator circuit it is impossible to lock the pilot signal oscillator used in receiving and recording the picture with which phase at that instant.

According to the present invention, the timing of the synchronizing signal such as the horizontal synchronizing signal hich is continuously transmitted by keeping a certain frequency relation to the chrominance subcarrier is always extracted so that a precise chrominance subcarrier frequency can be reproduced.

That is, a conventional picture recording and reproduction by a pilot system cannot frequency-lock the reference signal oscillator with the input chrominance subcarrier, so that it is impossible to record and repeatedly reproduce the color still picture signal of single frame or field, but according to the present invention, picture recording and reproducing by one frame or field memory of the still picture becomes possible even with the pilot system.

Furthermmore, in the abovementioned embodiment, the chrominance subcarrier frequency component is chiefly extracted from the horizontal synchronizing signal, but if the "signal" such as the PCM synchronizing signal, which is in a certain frequency relation with the chrominance subcarrier is added at the transmitting side besides the above described horizontal synchronizing signal, the chrominance subcarrier frequency component can be extracted from the "signal" in the same manner as described above. Further, in the above-mentioned embodiment, the picture recording and repeated reproduction of the color still picture in a unit frame is mainly explained, but the color still picture signal in a unit field can be recorded and repeatedly reproduced in the same manner as described above. Further, in the abovementioned embodiment, in order to generate a pilot signal, an oscillator which is frequency-locked to the incoming synchronizing signal is used, but by frequency multiplying or dividing the incoming synchronizing signal, it is possible to form the frequency locked pilot signal in well as the above embodiment.

Further, in the present NTSC color television system, a burst signal is transmitted as the reference phase of a chrominance subcarrier, but if the chrominance subcarrier and the horizontal synchronizing signal, the phases of which are maintained in a certain relation with each other, are transmitted at the transmitting side and a circuit which can lock with the phase of a well known PLL (phase lock loop) circuit is used at the receiving side, the present color burst signal becomes unnecessary, to that on the end portion of the horizontal blanking signal in the color television picture signal, the other information signal can be superimposed and the thus composed signal may be transmitted.

What is claimed is:

1. A color picture information recording and reproducing system for color picture signals including a chrominance subcarrier in any one frame or field transmitted together with a synchronizing signal having a frequency which is in a certain relation with that of said chrominance subcarrier, the system comprising:
   a single frame selector means for selectively recording color picture signals in any one frame or field period,
   a signal generator means for generating reference signals,
   a control means for controlling said signal generator means to frequency-lock the output of said signal generator means with the synchronizing signal included in the color picture signals,
   a first frequency divider means for dividing the frequency of the output of said signal generator means,
   a second frequency divider means for dividing the frequency of the output of the first frequency divider means to form a pilot signal,
   a first frequency adder means for combining the frequency of the output of said signal generator means with the frequency of the output of said first frequency divider means,
   a first modulator means for modulating the chrominance subcarrier of the color picture signals selected by the single frame selector means and supplied through a first band pass filter means with the output signal of said first frequency adder means,
   a first signal mixer means for mixing the output of the first modulator means applied through a second band pass filter means and the pilot signal,
   means for connecting the output of the first signal mixer means to a first recording means through a second FM modulator means,
   a first FM demodulator means for demodulating the color picture signals picked up from said first recording means,
   a signal extractor means for extracting the pilot signal from the output of said first FM demodulator means,
   a frequency multiplier means for multiplying the frequency of the output of said pilot signal extractor means,
   a second frequency adder means for combining the frequency of the output of said frequency multiplier means with the frequency of the output of said signal generator means,
   a third band pass filter means for extracting the chrominance subcarrier from the output of said first FM demodulator means,
   a third modulator means for modulating the chrominance subcarrier of the output of the third band pass filter means with the output of said second frequency adder means,
   a fourth band pass filter means coupled to the output of said third modulator means for extracting the chrominance subcarrier having the same frequency as an original chrominance subcarrier included in incoming color picture signals,
   a lowpass filter means for extracting the luminance signal component of the color picture signals selected by the single frame selector means,
   a second recording means for recording the luminance signal component supplied through a fourth FM modulator means,
   a second FM demodulator means for demodulating the luminance signal component picked up from said second recording means, and
   a second mixer means for mixing the output of said fourth band pass filter means with the output of said second FM demodulator means whereby the outputs of said second mixer means are used as desired color picture signals.

2. A color picture information recording and reproducing system as claimed in claim 1, wherein said control means comprises means for extracting the synchronizing signal of the color picture signals and a phase control means for controlling said signal generator means whereby the frequency of the output of the generator means is frequency locked with the frequency of the chrominance subcarrier of said color picture signals.

3. A color picture information recording and reproducing system as claimed in claim 2, wherein said means for extracting the synchronizing signal of the color picture signals is a horizontal synchronizing extractor circuit for extracting from the color picture signals the horizontal synchronizing signal of the color picture signals having a frequency which is in a certain relation with that of the chrominance subcarrier whereby the frequency of the output of the reference signal generator means is frequency-locked with the frequency of the chrominance subcarrier of the color picture signals.

4. A color picture information recording and reproducing system as claimed in claim 2, wherein said phase control means comprises a third frequency divider means for dividing the frequency of the color picture signals, a fourth frequency divider means for dividing the output of the signal generator means, a phase detector means for comparing the outputs of the third and the fourth frequency divider means to control the frequency of the output of the signal generator means and means for connecting the output of the phase detector means to said signal generator means.

5. A color picture information recording and reproducing system for color picture signals including a chrominance subcarrier in any one frame or field transmitted together with PCM audio signals including bit synchronizing signals having a frequency which is in a certain relation with that of the chrominance subcarrier, said color signals and said PCM audio signals being alternately transmitted at a time rate of a given integer ratio, comprising:

a single frame selector means for selectively recording color picture signals in any one frame or field period, a signal generator means for generating reference signals, a control means for controlling said signal generator means to frequency-lock the output of said signal generator means with the synchronizing signals included in the color picture signals, a first frequency divider means for dividing the frequency of the output of said signal generator means, a second frequency divider means for dividing the frequency of the output of the first frequency divider means to form a pilot signal, a first frequency adder means for combining the frequency of the output of said signal generator means with the frequency of the output of said first frequency divider means, a first modulator means for modulating the chrominance subcarrier of the color picture signals selected by the single frame selector means and supplied through a first band pass filter means with the output signal of said first frequency adder means, a first signal mixer means for mixing the outputs of the first modulator means applied through a second band pass filter means and the pilot signal, means for connecting the output of the first signal mixer means to a first recording means through a second FM modulator means, a first FM demodulator means for demodulating the color picture signals picked up from said first recording means, a signal extractor means for extracting the pilot signal from the output of said first FM demodulator means, a frequency multiplier means for multiplying the frequency of the output of said pilot signal extractor means, a second frequency adder means for combining the frequency of the output of said frequency multiplier means with the frequency of the output of said signal generator means, a third band pass filter means for extracting the chrominance subcarrier from the output of said FM demodulator means, a third modulating means for modulating the chrominance subcarrier of the output of the third band pass filter means with the output of said second frequency adder means, a fourth band filter means to the outputs of said third modulator means for extracting the chrominance subcarrier having the same frequency as an original chrominance subcarrier included in incoming color picture signals, a low filter means for extracting the luminance signal component of the color picture signals selected by the single frame selector means, a second recording means for recording the luminance signal component supplied through a fourth FM modulator means, a second FM demodulator means for demodulating the luminance signal component picked up from said second recording means, and a second mixer means for mixing the output of said fourth band pass filter means with the output of said second FM demodulator whereby the outputs of said second mixer means are used as desired color picture signals.

6. A color picture information recording and reproducing system as claimed in claim 5, wherein said control means comprises means for extracting the synchronizing signals of the color picture signals and a phase control means for controlling said signal generator means whereby the frequency of the output of the generator means is frequency locked with the frequency of the chrominance subcarrier of said color picture signals.

7. A color picture information recording and reproducing system as claimed in claim 6, wherein said means for extracting the synchronizing signals of the color picture signals is a bit synchronizing extractor circuit for extracting from the audio signals the bit synchronizing signals having a frequency which is in a certain relation with that of the chrominance subcarrier whereby the frequency of the output of the reference signal generator means is frequency-locked with the frequency of the chrominance subcarrier of the color picture signals.

8. A color picture information recording and reproducing system as claimed in claim 6, wherein said phase control means comprises a third frequency divider means for dividing the frequency of the color picture signals, a fourth frequency divider means for dividing the output of the signal generator means, a phase detector means for comparing the outputs of the third and the fourth frequency divider means to control the frequency of the output of the signal generator means and means for connecting the output of the phase detector means to said signal generator means.

* * * * *